United States Patent [19]
Holleman

[11] 3,782,534
[45] Jan. 1, 1974

[54] CONVEYOR BELT CLEANING DEVICE

[76] Inventor: Wouter Holleman, 15 Wren St., Vanderbijlpark, Transvaal, South Africa

[22] Filed: Jan. 18, 1972

[21] Appl. No.: 218,715

[30] Foreign Application Priority Data
Jan. 22, 1971  South Africa............................ 0412

[52] U.S. Cl.................................. 198/230, 74/230
[51] Int. Cl............................................. B65g 45/00
[58] Field of Search........................... 198/230, 188; 74/230

[56] References Cited
UNITED STATES PATENTS
3,631,968  1/1972  Ward................................. 198/230

FOREIGN PATENTS OR APPLICATIONS
1,265,652  4/1968  Germany............................ 198/230

*Primary Examiner*—Evon C. Blunk
*Assistant Examiner*—Douglas D. Watts
*Attorney*—Richard K. Stevens et al.

[57]  ABSTRACT

The invention is concerned with cleaning of material from conveyor belts and consists of at least one pair of blades each extending partway across a belt to be cleaned. The contiguous ends of the blades are made to overlap each other in the vicinity of the center line of the belt. The blades are mounted so that they can pivot about axes located parallel to and within the width of the belts while carried in mountings which can pivot about axes transverse to the belt. There may be a plurality of pairs of blades and the mountings will be supported in hangers which are also pivoted about axes extending across the belt.

7 Claims, 2 Drawing Figures

CONVEYOR BELT CLEANING DEVICE

This invention relates to cleaners for use with conveyor belts, which cleaners are adapted to remove material which adheres to the belt after a normal discharge operation.

Material clinging to conveyor belts after the load should have been discharged causes serious maintenance problems and can severely reduce the useful life of various components of a conveyor assembly. Various types of cleaners have been used in an attempt to remove the material referred to and these cleaners have not been satisfactory.

It is the object of the present invention to provide a conveyor belt cleaner which is of simple and effective construction and which can be satisfactorily used with a wide range of materials handled on conveyors.

According to this invention there is provided a conveyor belt cleaner comprising a plurality of contiguous blades adapted to be located to extend across at least the major part of the width of a conveyor belt with their adjacent ends in an overlapping relationship and with each blade pivotally supported for movement in a plane substantially normal to the surface of the belt with which it is to be used and with the pivot points located in the length of the blades and within the width of such belt.

Further features of this invention provide for the blades to be located at right angles to the length of the belt, for the blades to be pivotally supported in a mounting which is pivotally supported about an axis parallel to the blades and for the pivotal support for the mounting to be carried on a hanger swingable in a plane parallel to the length of the belt with which the cleaner is to be used.

The invention also provides for there to be a plurality of pairs of blades and for the blades to be elongated pads of rubber or rubber-like material replaceably held in holders which are pivotally supported.

A preferred embodiment of this invention is described below with reference to the accompanying drawings in which.

Figure 1:
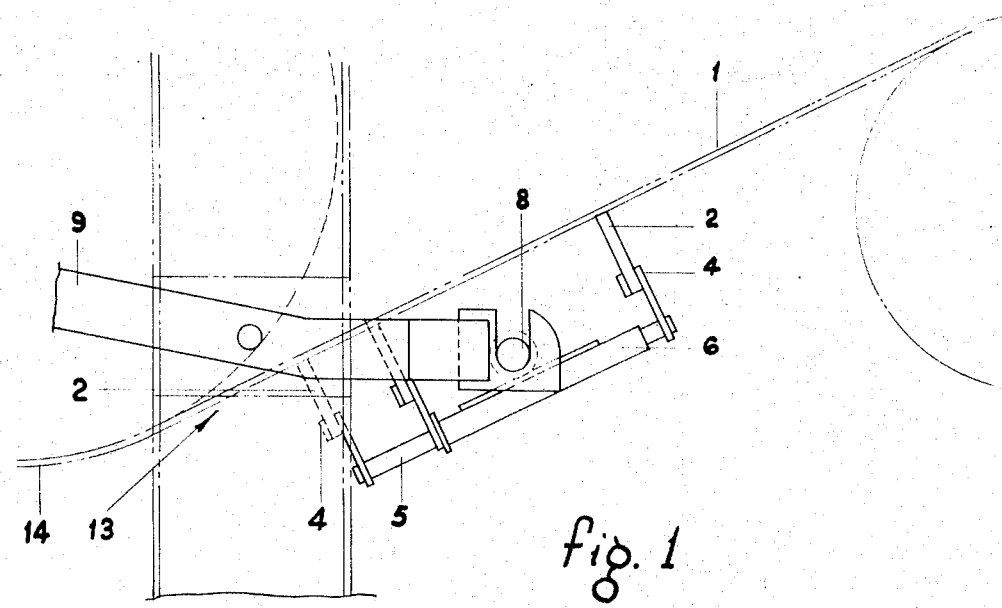
FIG. 1 is a diagrammatic side view of a cleaner installed.

As illustrated, the cleaner is to be used with a conveyor belt 1 and is slightly narrower than the width of the belt 1. It has been found in practice that this is satisfactory, since material adheres in the main only to the central part of the belt.

The cleaner consists of a plurality of pairs of blades 2, each pair extending across the width of the belt 1 with their adjacent ends in an overlapping relationship as shown at 3.

The blades consist of a holder 4 which supports a replaceable elongated rubber pad and the type of rubber will be chosen to meet particular requirements and in general will be such that it will have high abrasion resistance.

The holders 4 are each mounted on a rod 5 which is rotatable in a socket 6 which can conveniently be formed from a length of suitable metal tubing. Each of the sockets 6 are welded or otherwise secured to extend at right angles to a further similar socket member 7 rotatable on a bar 8. The two socket members 7 extend substantially the full distance between the arms 9.

The sockets 6 form a mounting which is pivotally supported by the assembly of member 7 and bar 8.

The assembly is carried in a hanger consisting of an oppositely disposed pair of arms 9 pivotally attached to standards which carry the belt cleaner. The arms 9 have extension 10 on the opposite side of the pivot attachment 11 to the bar 8 and the extensions 10 have counterweights 12 adjustably mounted thereon.

In the particular arrangement shown, it will be seen that the blade arrangement is such that there are two pairs of blades 2 at the front end 13 of the cleaner, that is, the end of the cleaner which is closest to the discharge end 14 of the belt.

During use, there is a universal movement which enables the individual blades 2 to tilt in a plane at right angles to the width of the belt 1 and the pivots are so arranged that they are located within the width of the belt. Thus if one end lifts, the other reacts against the belt, resulting in an even wear which enables the blades 2 to be reversed in the holders 4 and thus obtain maximum use of each blade.

Figure 2:
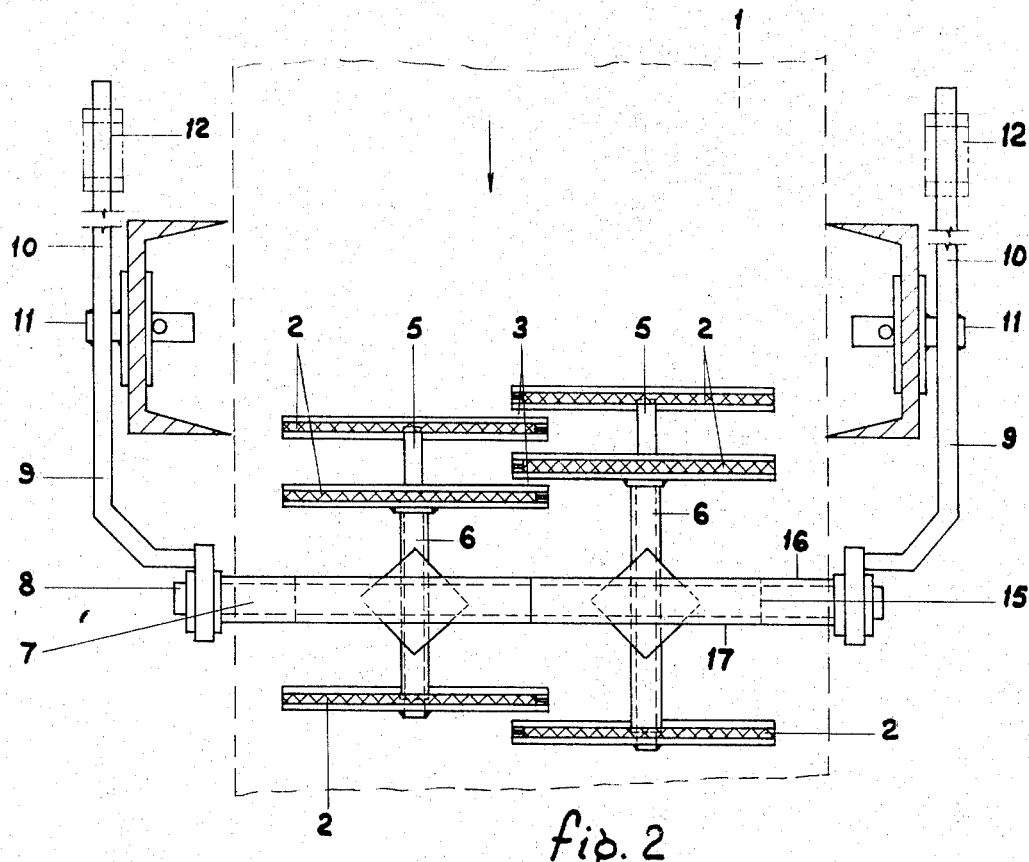
FIG. 2 is a plan of a cleaner assembly.

The direction of travel of the belt is indicated by the arrow in FIG. 2.

The counterweights 12 can be adjusted to determine the optimum pressure which is applied to the belt by the assembled cleaner and the pivotal mounting of the socket 6 through the member 7 and bar 8 enables the cleaner to ride over joins or other irregularities in the belt 1 when necessary.

It has been found that the cleaner operates satisfactorily with a wide range of materials and conditions with the independent blades in each pair giving the required cleaning effect.

As the assemblies are simply hung in the hanger arms 9 it will be understood that when the blades 2 require attention the assembly is easily removed from the arms 9 and replaced by a similar assembly. Reconditioning can then be effected away from the conveyor and a minimum shut down time will be necessary to maintain the conveyor cleaner in proper condition.

It will be appreciated that where wide belts are to be scraped it may be advantageous to use a plurality of blade assemblies as described above in a side by side relationship.

The invention is not limited to the particular embodiment described but may be varied both in the number and manner in which the components are pivotally supported. Also, it may, in some conditions, be desirable to vary the inclination of the blades 2 to the direction of travel of the belt 1 to obtain a plough-like effect of the blades on the material adhering to the belt. The blades may also be made of material different from that described above, when necessary.

A further modification which can be effected is that the members 7 can be divided into two lengths 16 and 17 indicated at dotted line 15. Length 17 is made to extend symmetrically on either side of the axis of member socket 6. This will enable the position of the sockets 6 to be interchanged in the assembly. This is advantageous since the blades 2 wear more at the center of the belt 1 than at the outer edge and the interchanging of the sockets 6 enables maximum wear of the blades to be obtained before it is necessary to replace the blades 2 in the holders 4. The lengths 16 can be used in their original positions to accurately locate the assembly relative to the belt.

What I claim as new and desire to secure by Letters Patent is:

1. A conveyor belt cleaner, comprising:
 a plurality of blades engagable with a conveyor belt for scraping same clean, the length of each blade being substantially less than the width of the major portion of said conveyor belt; and
 means separately mounting said blades for pivotal movement about their separate respective axes of rotation substantially parallel to the longitudinal axis of said belt;
 said blades being mounted transversely of said belt such that adjacent blades are offset with respect to each other and such that opposite end portions of said adjacent blades overlap each other in spaced relation near the center of said belt and further such that the combined width of said blades extends across the major portion of the width of said belt from the center of the belt toward the edges thereof.

2. A conveyor belt cleaner according to claim 1, wherein said blades are disposed substantially at right angles to the longitudinal axis of said belt.

3. A conveyor belt cleaner according to claim 1, comprising further mounting means mounting said blades for pivotal movement about an axis of rotation substantially perpendicular to the longitudinal axis of said belt.

4. A conveyor belt cleaner according to claim 3, wherein said separate mounting means comprises first and second members fixed to said further mounting means, said blades being mounted on said first and second members, respectively, for rotation relative to said members.

5. A conveyor belt cleaner according to claim 3, comprising a plurality of pairs of said overlapping blades, said pairs of blades being located along the direction of travel of said belt and wherein at least one pair of blades is mounted on one side of said further mounting means relative to the longitudinal direction of movement of said belt and at least one further pair of blades is mounted on the opposite side of said further mounting means from said pair of blades relative to the longitudinal direction of movement of said belt.

6. A conveyor belt cleaner according to claim 5, wherein at least two pairs of blades are mounted on said further mounting means on said one side thereof and one pair of blades is mounted on said further mounting means on said opposite side thereof.

7. A conveyor belt cleaner according to claim 1, wherein said plurality of blades comprises a plurality of pairs of said overlapping blades mounted on said mounting means, said pairs of blades being located one behind the other in the direction of travel of said belt.

* * * * *